United States Patent [19]

Davenport

[11] 3,712,517
[45] Jan. 23, 1973

[54] TRIPLE SEAL VALVE
[75] Inventor: Richard L. Davenport, Racine, Wis.
[73] Assignee: S. C. Johnson & Son, Inc., Racine, Wis.
[22] Filed: April 21, 1971
[21] Appl. No.: 135,975

[52] U.S. Cl. ............222/402.13, 222/509, 222/521, 222/525
[51] Int. Cl. ...............................B65d 83/14
[58] Field of Search...222/528, 524, 509, 510, 402.1, 222/402.13, 505, 518, 402, 525, 511, 514, 521, 402.12, 402.24; 239/117, 579, 583

[56] References Cited

UNITED STATES PATENTS

| 3,250,474 | 5/1966 | McKernan | 239/579 |
| 3,542,253 | 11/1970 | Weber | 222/402.24 X |
| 3,166,250 | 1/1965 | Kappel | 222/402.24 X |

Primary Examiner—Robert B. Reeves
Assistant Examiner—James M. Slattery
Attorney—Joseph T. Kivlin, Jr. and Thomas A. Hodge

[57] ABSTRACT

A discharge valve for a pressurized container is provided with a telescoped axially movable tubular nozzle which cooperates with a sidewall aperture in a stationary elastomeric encircling sleeve for controlling the egress of material. A valve stem within the nozzle cooperates with a discharge orifice at the outer nozzle end to seal same when the nozzle is in valve closing position and to expose same when the nozzle is moved to valve open position thereby preventing nozzle clogging.

7 Claims, 6 Drawing Figures

PATENTED JAN 23 1973

3,712,517

INVENTOR.
RICHARD L. DAVENPORT
BY

TRIPLE SEAL VALVE

The present invention relates to valves for controlling the outflow of the contents from a pressurized container and, more particularly, to the class of valves referred to by the appellation "aerosol."

A typical problem encountered in aerosol valves in common use today is the clogging of the exit or discharge orifice due to congealing of a residue of the contents of the container remaining after a discharging operation of the valve. Many attempts have been made to solve this problem but they are generally unsatisfactory for one reason or another.

It is, therefore, an object of the present invention to provide a novel dispensing valve which is self-cleaning and maintains its discharge orifice free from clogging. It is a further object to provide such a valve which is positive and reliable in operation.

In accordance with the invention there is provided a dispensing valve of the aforesaid type comprising in combination a tubular nozzle open at one end and closed at the opposite end except for a discharge orifice, a valve stem, and a sleeve of elastomeric material. The nozzle has its open end telescoped over one end of the valve stem and is movable axially relative thereto. The one end of the valve stem within the nozzle is arranged for plugging the discharge orifice to seal off the interior of the nozzle from the atmosphere when the nozzle is moved onto the stem toward its opposite end. The elastomeric sleeve is in fixed position encircling the stem and receives radially inwardly the open end of the nozzle with a snug sliding fit. An aperture is provided through the wall of the sleeve which is uncovered when the nozzle is moved axially away from the stem to unplug the discharge orifice and which is sealingly covered by the nozzle upon its movement in the opposite direction. Means are provided for placing the contents of the container in confined communication with the radially outer surface of the sleeve at the aperture. In addition, space is provided between the stem and the nozzle longitudinally thereof for permitting the passage of the contents of the container from said aperture to said discharge orifice when the aperture is uncovered by the nozzle. Finally, means are provided for selectably imparting movement to the nozzle to cover and uncover the aperture.

The invention will be better understood after reading the following detailed description of the presently preferred embodiments thereof with reference to the appended drawings in which.

Referring now to the drawings, the same reference numerals are used throughout the several figures to designate the same or similar parts.

Figure 1:
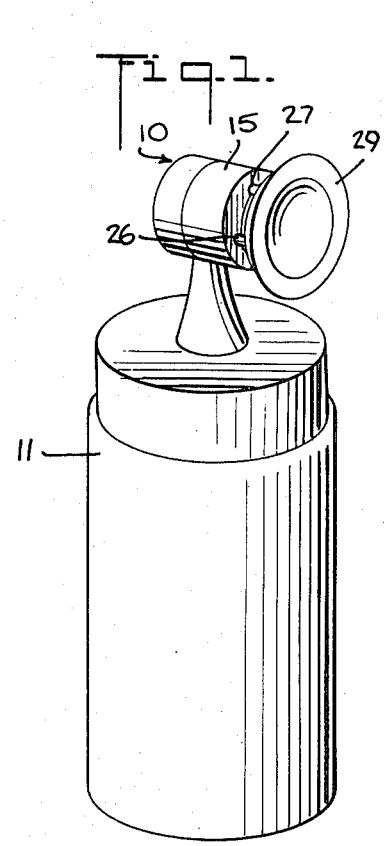
FIG. 1 is a perspective view of a dispensing valve constructed in accordance with the invention mounted on a pressurized container.

Referring to FIGS. 1 to 4, the dispensing valve embodying the invention is designated generally by the reference numeral 10. In FIG. 1 it is shown mounted on a container 11 from which container the valve controls the outflow of the contents which are under pressure.

The valve 10 consists of a tubular nozzle 11 open at one end 12 and closed at the opposite end 13 except for a discharge orifice 14. The valve has a main body structure 15 provided with a cavity or recess 16 within which is disposed a sleeve 17 of elastomeric material. The sleeve 17 has an aperture 18 in the wall thereof which aperture communicates with a passage 19 through the body structure which communicates with the interior of the container 11 in known manner. Disposed concentrically within the cavity 16 is a valve stem 20 provided with a conical tip 21 which mates complementally with the concave conical seating surface 22 on the interior of the nozzle 11.

Figure 2:
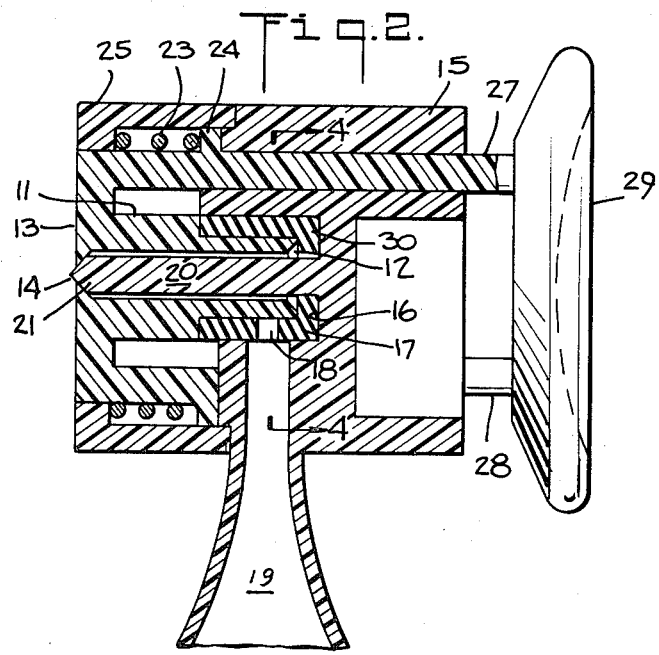
FIG. 2 is a vertical sectional view taken along the line 2,2 in FIG. 1 and showing the valve in closed condition.
Figure 4:
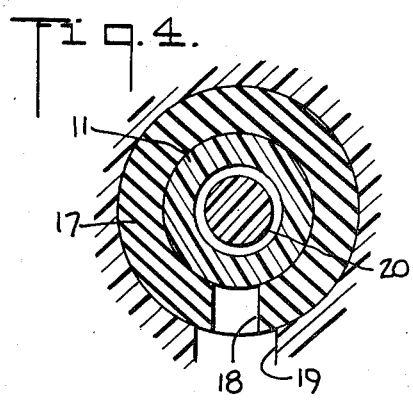
FIG. 4 is a fragmentary transverse sectional view drawn to an enlarged scale taken along the line 4,4 in FIG. 2.
Figure 3:
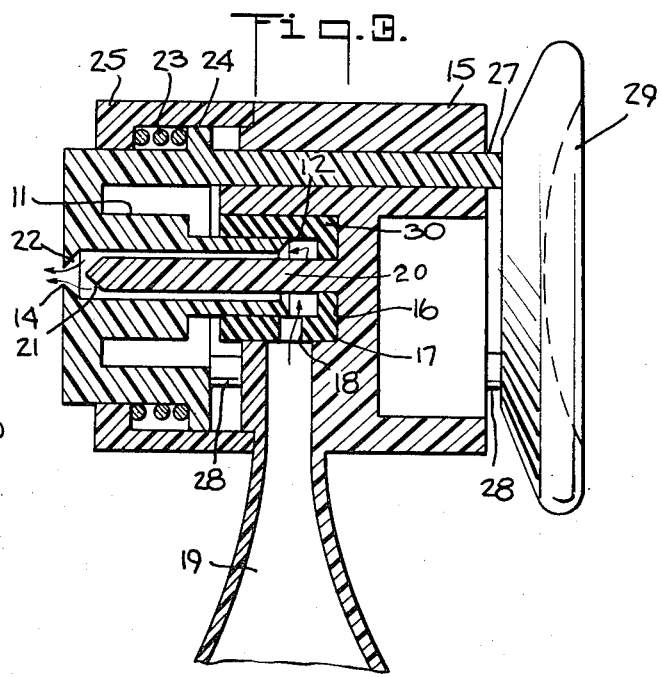
FIG. 3 is a view similar to FIG. 2, but showing the valve in partially open condition.

As seen in the drawings the nozzle 11 has its open end 12 telescoped over one end of the stem 20 and is movable axially relative thereto. The end 21 of the stem 20 within the nozzle 11 is arranged for plugging the discharge orifice 14 to seal off the interior of the nozzle from the atmosphere when the nozzle is moved onto the stem toward its opposite end as shown in FIG. 2. The sleeve 17 is in fixed position within the cavity 16 in the body member 15 encircling the stem and receiving radially inwardly the open end 12 of the nozzle 11 with a snug sliding fit. The aperture 18 in the wall of the sleeve 17 is uncovered when the nozzle is moved axially away from the stem to unplug the discharge orifice 14 as best seen in FIG. 3. In the closed position shown in FIG. 2, the nozzle 11 sealingly covers the aperture 18 in the sleeve 17. The inner bore of the nozzle 11 is larger than the outer diameter of the stem 20 to provide space therebetween longitudinally thereof for permitting the passage of the contents of the container from the aperture 18 in the direction of the arrows shown in FIG. 3 to the discharge orifice 14 when the aperture 18 is uncovered by the nozzle 11.

A helical spring 23 bearing against a shoulder 24 on the nozzle element 11 and retained by the cap closure 25 urges the nozzle to the closed position shown in FIG. 2. A plurality, here shown as three, of arms or extensions 26, 27 and 28 are connected to a manipulating button 29 under whose control the nozzle 11 may be moved toward the valve open position.

The elastomeric sleeve 17 is provided with an integral end closure 30 of the same material closely surrounding the stem 20. The inner edge 12 of the nozzle 11 at its open end is movable into sealing engagement with the end closure 30.

Figure 5:
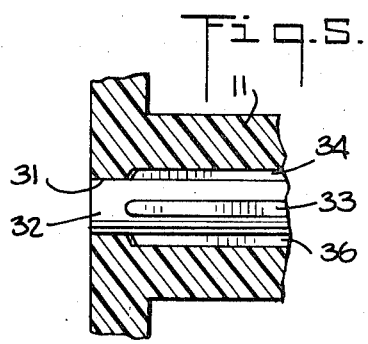
FIG. 5 is a fragmentary sectional view similar to FIG. 2 but showing a modification of the invention.
Figure 6:
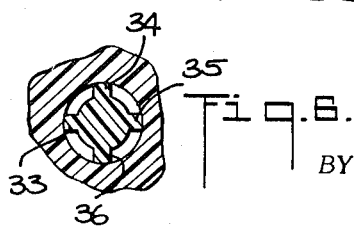
FIG. 6 is a transverse sectional view taken along the line 6,6 in FIG. 5.

It will be understood that the materials from which the various parts are fabricated are selected in order to permit the nozzle to slide relative to the sleeve 17 while establishing sufficient interference to develop a fluid seal in the axial and circumferential directions. The tip 21 of the valve stem 20 need not make intimate contact with the valve seat surface 22 so long as the contents of the container have a low solids film forming characteristic. It will normally be adequate if the discharge orifice is closed sufficiently to prevent the entire opening from being plugged by a congealed residue. Of course, if adequate care is taken in controlling tolerances in manufacture it is possible to obtain a reasonably good seal at both the discharge orifice and at the inner end of the nozzle against the end closure 30. It may, under certain circumstances, be advantageous to provide a layer of elastomeric material either on the conical surface at the tip 21 of stem 20 or on the seating surface 22, or on both.

Where material with a higher solid content is to be handled, it may be preferable to employ the modification shown in FIGS. 5 and 6. As seen therein, the discharge orifice consists of a cylindrical bore 31 and the end of the valve stem has a cylindrical region 32 which makes a substantially close sliding fit with the bore 31 when plugging the orifice. The body of the valve stem may be provided with radially extending ribs such as 33, 34, 35 and 36 for spacing the stem concentrically within the bore of the nozzle 11. By so spacing the stem relative to the nozzle, the stem is guided in its movement both into and out of the bore 31. With this arrangement, any solid material congealing within the bore 31 when the valve is open and in operation is forced out when the valve is closed. Alternatively, the rib may be on the inner wall of the nozzle.

Having described the presently preferred embodiments of the invention, it will be understood by those skilled in the art that numerous changes in construction may be made therein without departing from the true spirit of the invention as defined in the appended claims.

What is claimed is:

1. A dispensing valve for controlling the outflow of the contents from a pressurized container comprising in combination: a tubular nozzle open at one end and closed at the opposite end except for a discharge orifice, a valve stem, a sleeve of elastomeric material, an end closure member of elastomeric material, said nozzle having its open end telescoped over one end of said stem and being movable axially relative thereto, the opposite end of said stem being carried by a body member, said one end of said stem within said nozzle being arranged for plugging said discharge orifice to seal off the interior of said nozzle from the atmosphere when said nozzle is moved onto said stem toward said opposite end of said stem, said end closure member being adjacent said body member around said opposite end of said stem and aligned such that said open end of said nozzle seals against said closure member when said nozzle has moved onto said stem, said sleeve being in fixed position encircling said stem and receiving radially inwardly said open end of the nozzle with a snug sliding fit, there being an aperture through the wall of said sleeve which is uncovered when said nozzle is moved axially away from said stem to unplug said discharge orifice and which is sealingly covered by said nozzle upon its movement in the opposite direction, means for placing the contents of said container in confined communication with the radially outer surface of said sleeve at said aperture, space being provided between said stem and said nozzle longitudinally thereof for permitting the passage of the contents of said container from said aperture to said discharge orifice when said aperture is uncovered by said nozzle, and means for selectably imparting movement to said nozzle to cover and uncover said aperture.

2. A dispensing valve according to claim 1, wherein said discharge orifice has a concave conical seating surface on the interior of said nozzle, and said one end of said stem has a complemental conical surface for cooperating with said seating surface.

3. A dispensing valve according to claim 1, wherein said discharge orifice consists of a cylindrical bore, said one end of said stem has a cylindrical region which makes a substantially close sliding fit with said bore when plugging said orifice, and wherein means are provided for guiding the movement of said end of the stem into and out of said bore.

4. A dispensing valve according to claim 1, wherein, said sleeve is disposed within a cavity in said body member around said opposite end of said stem, and said means for providing communication between said container contents and said sleeve comprises a passage in said body member leading to said cavity.

5. A dispensing valve according to claim 1, wherein said one end of said stem is provided with an elastomeric sealing surface for elastic engagement with said discharge orifice.

6. A dispensing valve for controlling the outflow of the contents from a pressurized container comprising in combination: a tubular nozzle open at one end and closed at the opposite end except for a discharge orifice, a valve stem carried by a body member, a sleeve of elastomeric material, said sleeve being disposed within a cavity in said body member around the opposite end of said stem and comprising an integral end closure portion of the same material closely surrounding said stem, said nozzle having its open end telescoped over one end of said stem and being movable axially relative thereto, said one end of said stem within said nozzle being arranged for plugging said discharge orifice to seal off the interior of said nozzle from the atmosphere when said nozzle is moved onto said stem towards its opposite end, the edge of said nozzle at its open end being movable into sealing engagement with said end closure member, means for urging said nozzle against said end closure, said sleeve being in fixed position encircling said stem and receiving radially inwardly said open end of the nozzle with a snug sliding fit, there being an aperture through the wall of said sleeve which is uncovered when said nozzle is moved axially away from said stem to unplug said discharge orifice and which is sealingly covered by said nozzle upon its movement in the opposite direction, means for placing the contents of said container in confined communication with the radially outer surface of said sleeve at said aperture, said means comprising a passage in said body member leading to said cavity, space being provided between said stem and said nozzle longitudinally thereof for permitting the passage of the contents of said container from said aperture to said discharge orifice when said aperture is uncovered by said nozzle, and means for selectably imparting movement to said nozzle to cover and uncover said aperture.

7. A dispensing valve for controlling the outflow of the contents from a pressurized container comprising in combination: a tubular nozzle open at one end and closed at the opposite end except for a discharge orifice, a valve stem, a sleeve of elastomeric material, said sleeve including an integral end closure portion of the same material closely surrounding said stem beyond said open end of said nozzle, said nozzle having its open end telescoped over one end of said stem and being movable axially relative thereto, said one end of said stem within said nozzle being arranged for plugging said discharge orifice to seal off the interior of said nozzle from the atmosphere when said nozzle is moved onto said stem toward its opposite end, the edge of said nozzle at its open end being movable into sealing engagement with said end closure portion of said sleeve, means for urging said nozzle against said end closure, said sleeve being in fixed position encircling said stem and receiving radially inwardly said open end of the nozzle with a snug sliding fit, there being an aperture through the wall of said sleeve which is uncovered when said nozzle is moved axially away from said stem to unplug said discharge orifice and which is sealingly covered by said nozzle upon its movement in the opposite direction, means for placing the contents of said container in confined communication with the radially outer surface of said sleeve at said aperture, space being provided between said stem and said nozzle longitudinally thereof for permitting the passage of the contents of said container from said aperture to said discharge orifice when said aperture is uncovered by said nozzle, and means for selectably imparting movement to said nozzle to cover and uncover said aperture.

* * * * *